(12) United States Patent
Doucet (10) Patent No.: US 7,128,049 B2
(45) Date of Patent: Oct. 31, 2006

(54) FLOW GUIDING STRUCTURE FOR AN INTERNAL COMBUSTION ENGINE

(76) Inventor: Rejean Doucet, 8745, Des Forges #A, Trois-Rivieres, Que (CA) G8Y 4E9

( * ) Notice: Subject to any disclaimer, the term of this patent is extended or adjusted under 35 U.S.C. 154(b) by 0 days.

(21) Appl. No.: 10/894,843

(22) Filed: Jul. 19, 2004

(65) Prior Publication Data

US 2005/0011488 A1    Jan. 20, 2005

(30) Foreign Application Priority Data

Jul. 19, 2003    (GB) .................................. 0316975.2

(51) Int. Cl.
*F02B 31/00*    (2006.01)
*F02M 29/00*    (2006.01)

(52) U.S. Cl. ....................... 123/306; 123/590; 123/592

(58) Field of Classification Search ................ 123/306, 123/590, 592

See application file for complete search history.

(56) References Cited

U.S. PATENT DOCUMENTS

| 4,417,562 | A | * | 11/1983 | Dalke | 123/592 |
| D414,191 | S | * | 9/1999 | Kim | D15/5 |
| 6,258,144 | B1 | * | 7/2001 | Huang | 55/385.3 |
| D469,781 | S | * | 2/2003 | Kim | D15/5 |
| 6,536,420 | B1 | * | 3/2003 | Cheng | 123/590 |
| 6,550,446 | B1 | * | 4/2003 | Robley, Jr. | 123/306 |
| 6,837,213 | B1 | * | 1/2005 | Burnett | 123/306 |

* cited by examiner

*Primary Examiner*—Hai Huynh (57) ABSTRACT

A flow guiding structure for guiding into a clockwise swirling flow pattern gas flowing into a gas passageway leading toward a combustion chamber of an internal combustion engine. The structure includes a tubular peripheral wall having a base section for securing the structure to the gas passageway and an integrally extending guiding section. A plurality of guiding vanes extend radially inward from the guiding section each about a corresponding vane first edge. Each guiding vane includes a vane second edge extending in a geometrical plane perpendicular to the structure longitudinal axis. Each guiding vane further includes a substantially convex vane third edge. The guiding section is provided with a plurality of guiding bents formed therein and extending radially inwardly. The guiding bents are adapted to act as an auxiliary guide and as reinforcement for the structure.

22 Claims, 4 Drawing Sheets

FLOW GUIDING STRUCTURE FOR AN INTERNAL COMBUSTION ENGINE

FIELD OF THE INVENTION

The present invention relates to the general field of internal combustion engine accessories and is particularly concerned with a flow guiding structure for guiding into a predetermined flow pattern a volume of gas flowing into a gas passageway leading towards a combustion chamber of an internal combustion engine.

BACKGROUND OF THE INVENTION

As is well known in the art, internal combustion engines produce mechanical power from the chemical energy stored in hydrocarbon fuel. This energy is released by oxidising or burning fuel within the cylinders of the engine.

The amount of power released from the fuel is function of the degree of oxidation and, hence, is dependent on the amount of oxygen available during combustion. As a general principle, the greater the degree of oxidation of the fuel, the higher the efficiency and the greater the power output, reflected respectively by the gas mileage and horsepower of a vehicle.

Three major pollutants typically result from combustion of hydrocarbon in internal combustion engines. These pollutants are oxides of nitrogen, oxides of carbon and hydrocarbon. Carbon dioxide is generally considered a non-toxic necessary by-product of the hydrocarbon oxidation process.

With respect to the nitrogen oxide emissions, their formation is understood to be largely a function of combustion temperatures. However, it is presently understood that leaner fuel-air mixtures and improved mixing of fuel and air may tend to reduce the formation of nitrogen oxides.

With respect to carbon monoxide and hydrocarbon emissions, it is understood that increased oxidation during combustion tends to reduce the formation of these compounds by way of oxidation.

A conventional method for reducing emissions to the environment of the by-products of internal combustion engines oxidation is to use so-called catalytic converters. Catalytic converters however suffer from numerous drawbacks. For example, they are relatively costly and their effectiveness is reduced over time. Hence, they require periodical inspection and replacement to maintain performance.

The life-span of conventional catalytic converters is understood to be a function of the amount of pollutants (primarily unburned hydrocarbons) the device has processed. Accordingly, in addition to increasing the efficiency and power output of combustion, increasing oxidation during combustion is also likely to increase the life-span of the conventional catalytic converters.

As is also well known in the art, reciprocating engines of the Wankel-type typically include a piston mounted for reciprocating or back and forth movement in a cylinder. The piston transmits power through a connecting rod and crank mechanism to the drive shaft. The majority of reciprocating engines operate on what is called a four-stroke cycle, i.e. each cylinder of the engine requires four-strokes of its piston or two revolutions of the crank shaft to complete the sequence of the cycle which produces one power stroke.

The first stroke is termed an intake stroke. It starts with the piston at the top centre crank position and ends with the piston at the bottom centre crank position. As the piston moves from the top to the bottom centre crank position, fresh intake mixture generally comprised of air or air and fuel is drawn into the cylinder through an inlet valve. The inlet valve typically opens just before the stroke starts and closes shortly after it ends.

Whether the intake mixture drawn into the cylinder is comprised of air or an air and fuel mixture is dependent on the engine. For example, in a typical spark emission engine, air passes through an air filter and then is mixed with fuel in the intake system prior to entry to the engine using a carburetor or fuel injection system. The air-fuel mixture is then drawn into the cylinder via the intake valve during the intake stroke. In comparison, a compression ignition engine inducts air alone into the cylinder during the intake stroke and the fuel is directly injected into the engine cylinder just before combustion.

Within internal combustion engines found on most vehicles, the engine takes in large volumes of air at a relatively rapid rate which is then conducted to Venturis within a carburetor is to be mixed with vaporised gasoline and then conducted within the firing cylinders of the engine.

At present, carburetors manage to vaporise approximately 40% of the gasoline in the air and this slow vaporisation rate results in incomplete and inefficient combustion of the gasoline in the engine cylinders, resulting in relatively poor gasoline mileage for the vehicle being driven and relatively high output of combustion products or pollutants.

The use of means for improving the degree of oxidation of the fuel in an internal combustion engine has long been known. For example, in order to increase the volume of the intake mixture into the combustion chamber of internal combustion engines, devices such as turbo-chargers and super-chargers are sometimes used. Although somewhat useful, such devices suffer from numerous drawbacks including that they are relatively expensive to manufacture and service. Furthermore, they draw usable power from the engine and are prone to wear. Still furthermore, they require space within the engine compartment for mounting and increase the overall weight of the motor vehicle.

Another type of means used for improving the degree of oxidation of the fuel in an internal combustion engine includes positioning a structure within the fuel/air stream prior to entry within the firing cylinders so as to cause turbulence of the fuel/air stream. The use of such structures allows the air entering into the combustion chamber to be in a swirling or turbulence state. Turbulent air flow provides a more complete and uniform mixture of air/fuel and, hence, improves the combustion of the charge within the combustion chamber.

The prior art has shown some examples of air turbulence generators for internal combustion engines. For example, U.S. Pat. No. 6,158,412 issued to Kelsen and naming J. S. Kim as inventor discloses a device which may be used to create swirling, turbulent flow to the air entering an internal combustion engine and to the exhaust gases therefrom prior to the gases entering an air pollution system.

The device utilises multiple curved and radially angled vanes to force the air into a predetermined turbulent, swirling pattern. For carburetor engines, the device is positioned between the air filter and the inlet to the carburettor and on fuel injection engines, the device is positioned at the inlet port of the intake manifold. Within the exhaust system, the device is positioned within the exhaust tubes just upstream of the catalytic converter to force the gases into a swirling and turbulent flow.

U.S. Pat. No. 6,041,753 issued Mar. 28, 2000 to Lyn et al. discloses an intake swirl enhancing structure including a guide shaft and several guide interfaces radially extending from the guide shaft to split a space into several intake passages. Each of the guide interfaces has a curved outer corner near an outlet end of the intake passages to swirl gas flowing through and out each intake passage.

Although somewhat useful, known prior art gas swirling devices suffer from numerous drawbacks. For example, the flow pattern created by prior art gas swirling devices is often considered to be sub-optimal. Also, the proportion of the surface of the guiding vanes being used for effectively guiding the flow of gas is often considered to be too small.

Furthermore, some prior art devices suffer from the particular defect of overcomplexity, with resulting high manufacturing costs and a propensity to require service and/or repair. Some prior art devices also create an undue restriction to the flow of gases.

Accordingly, there exists a need for an improved flow guiding structure. It is a general object of the present invention to provide such an improved flow guiding structure for internal combustion engines.

In accordance with an embodiment of the present invention, there is provided a flow guiding structure for guiding into a predetermined flow pattern a flow of gas flowing into a gas passageway leading towards a combustion chamber of an internal combustion engine, the gas passageway including a passageway delimiting wall and defining a passageway axis, the structure comprising: a substantially tubular peripheral wall delimiting a structure passage, the peripheral wall defining a peripheral wall first edge, an opposed peripheral wall second edge and a passage longitudinal axis; the peripheral wall having a base section extending from the peripheral wall first edge for allowing the structure to be secured to the gas passageway; the peripheral wall also having a guiding section extending substantially from the base section to the peripheral wall second edge for allowing the flow of gas to be guided into the predetermined flow pattern; a plurality of guiding vanes, each extending substantially radially inward from the guiding section about a corresponding vane first edge; each of the vane first edges extending from a first edge proximal end located substantially adjacent the base section to a first edge distal end located substantially adjacent the peripheral wall second edge; at least one of the guiding vanes including a vane second edge extending in a second edge geometrical plane substantially perpendicular to the structure longitudinal axis from the first edge distal end to a second edge distal end; the at least one of the guiding vanes also including a vane third edge extending from the second edge distal end to the first edge proximal end.

In accordance with an embodiment of the present invention, there is also provided flow guiding structure for guiding into a predetermined flow pattern a flow of gas flowing into a gas passageway leading towards a combustion chamber of an internal combustion engine, the gas passageway including a passageway delimiting wall and defining a passageway axis, the structure comprising: a plurality of guiding vanes, each extending substantially radially inward from the guiding section about a corresponding vane first edge; each of the vane first edges extending from a first edge proximal end located substantially adjacent the base section to a first edge distal end located substantially adjacent the peripheral wall second edge; each of the guiding vanes including a vane second edge extending in a second edge geometrical plane substantially perpendicular to the structure longitudinal axis from the first edge distal end to a second edge distal end; each of the guiding vanes also including a vane third edge extending from the second edge distal end to the first edge proximal end.

In accordance with an embodiment of the present invention, there is further provided a flow guiding structure for guiding into a predetermined flow pattern a flow of gas flowing into a gas passageway leading towards a combustion chamber of an internal combustion engine, the gas passageway including a passageway delimiting wall and defining a passageway axis, the structure comprising: a substantially tubular peripheral wall delimiting a structure passage, the peripheral wall defining a peripheral wall first edge, an opposed peripheral wall second edge and a passage longitudinal axis; the peripheral wall having a base section extending from the peripheral wall first edge for allowing the structure to be secured to the gas passageway; the peripheral wall also having a guiding section extending substantially from the base section to the peripheral wall second edge for allowing the flow of gas to be guided into the predetermined flow pattern; a plurality of guiding vanes, each extending radially inward from the guiding section, the guiding vanes being configured, sized and positioned so as to guide the flow of gas into the predetermined flow pattern; the guiding section being provided with at least one guiding bent formed therein and extending substantially inward into the structure passage, the at least one guiding bent being configured, positioned and sized so as to act as an auxiliary guide and cooperate with the guiding vanes for guiding the flow of gas into the predetermined flow pattern.

In accordance with an embodiment of the present invention, there is still further provided a flow guiding structure for guiding into a predetermined flow pattern a flow of gas flowing into a gas passageway leading towards a combustion chamber of an internal combustion engine, the gas passageway including a passageway delimiting wall and defining a passageway axis, the structure comprising: a substantially tubular peripheral wall delimiting a structure passage, the peripheral wall defining a peripheral wall first edge, an opposed peripheral wall second edge and a passage longitudinal axis; the peripheral wall having a base section extending from the peripheral wall first edge for allowing the structure to be secured to the gas passageway; the peripheral wall also having a guiding section extending substantially from the base section to the peripheral wall second edge for allowing the flow of gas to be guided into the predetermined flow pattern; a plurality of guiding vanes, each extending substantially radially inward from the guiding section, the guiding vane being configured, sized and positioned so as to guide the flow of gas into a substantially clockwise swirling flow pattern.

Advantages of the present invention include that the proposed structure allows for a flow of gas flowing into a gas passageway leading towards the combustion chamber of an internal combustion engine to be guided into a predetermined flow pattern so as to improve the mixing of air and fuel in the combustion chamber.

The proposed structure allows for the guidance of the intake flow into an optimally configured intake swirl or vortex pattern. The swirl is directed in a clockwise direction and generally radially outwardly. The induction of such an airflow configuration has been found to improve gas mileage, increased horse-power as well as reduced carbon monoxide and hydrocarbon emissions.

It is presently understood that the reason for these results is increase air intake to the cylinder or improved mixing of the fuel and air prior to combustion which is understood to likely result in the improved oxidation of the fuel. It is also presently understood that the increased air intake is likely to be the result of similarities in geometry between the valve head and the swirling air flow or vortex. These similarities may likely result in the valve head opposing less resistance so the intake mixture.

The guiding vanes of the structure are configured, sized and positioned so as to optimize the proportion of the surfaces effectively guiding the flow of gas. Also, the proposed device is provided with auxiliary guiding means for further improving the guiding of the flow of gas. The auxiliary guiding means also act as a structural reinforcement for the proposed structure.

The proposed structure is designed so as to be usable with various types of fuels and various types of engines including naturally aspirated and turbo-charged positive displacement internal combustion engines using carburettors, fuel injection or the like. The proposed device is further designed so as to prevent undue flow restriction which could starve the engine of air and/or cause incomplete combustion and sluggishness.

The proposed device is designed so as to be mountable at various locations including in close proximity to the intake of the combustion engine through a set of quick and ergonomical steps without requiring special tooling, manual dexterity or major alterations to the conventional engine and/or its accessories. The proposed device is designed so as to be easily retro-fitted to existing engines as well as installed with new ones.

Typically, the proposed structure is designed so as to be manufacturable out of an integral piece of material through a set of bending and die-cutting operations. Yet, still furthermore, the proposed structure is designed so as to be manufacturable using conventional forms of manufacturing and conventional materials so as to provide a structure that will be economically feasible, long-lasting and relatively trouble-free in operation.

Optionally, the device allows for various types of swirl energy in the intake air based on characteristics of the engine and other vehicle parameters. For example, a general high swirling motion of the air is needed in the combustion chamber at lower engine operating speeds in order to enhance the fuel/air mixing process while a lower swirling motion of the air is desirable at higher engine speeds during which the swirl energy needed to assist in the mixing process is reduced due to the increased energy derived from the incoming gases at the higher piston speeds.

BRIEF DESCRIPTION OF THE DRAWINGS

An embodiment of the present invention will now be disclosed, by way of example, in reference to the following drawings, in which.

DETAILED DESCRIPTION

Figure 5:
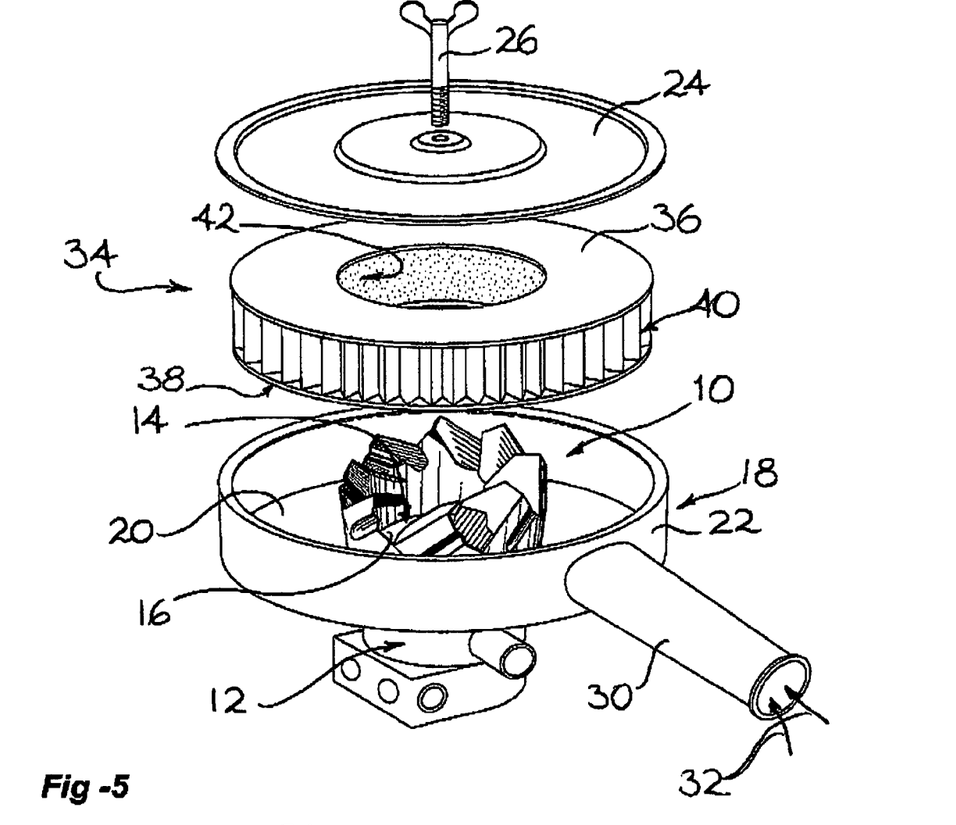
FIG. 5, in a partially exploded perspective view, illustrates a flow guiding structure in accordance with an embodiment of the present invention, the flow guiding structure being shown mounted adjacent the intake system of an internal combustion engine employing a carburettor.
Figure 6:
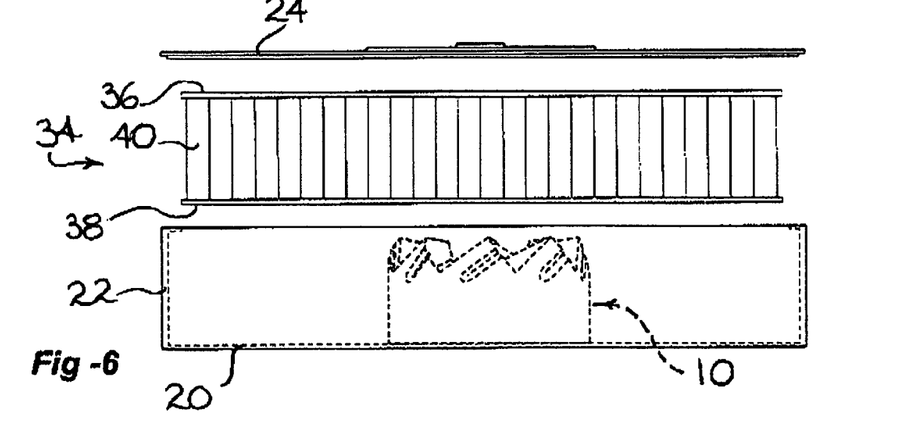
FIG. 6, in a partially exploded elevational view, illustrates a flow guiding structure in accordance with an embodiment of the present invention, the flow guiding structure being shown mounted inside the air filter chamber of the intake system of an internal combustion engine employing a carburettor.
Figure 7:
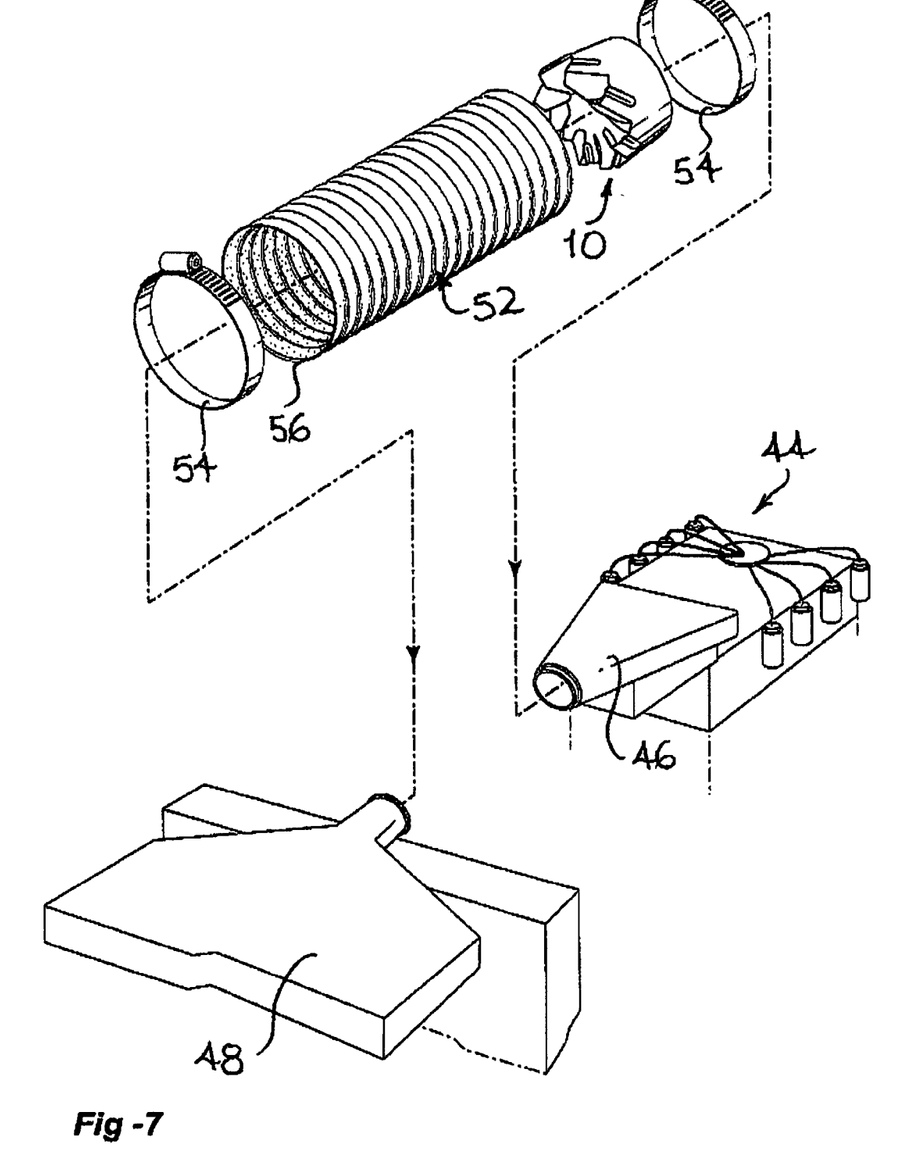
FIG. 7, in a partially exploded perspective view, illustrates a flow guiding structure in accordance with an embodiment of the present invention, the flow guiding structure being mounted in the air intake system of a fuel injected internal combustion engine.

Referring to FIGS. 5 and 7, there is shown a flow guiding structure in accordance with an embodiment of the present invention generally indicated by the reference numeral 10. The structure 10 is shown mounted in the air intake system of an internal combustion engine employing respectively a carburettor 12 and a fuel injector (not shown). It should be understood that although the structure 10 is shown being used with specific types of engines, the structured 10 could be used with any other suitable type of engines without departing from the scope of the present invention, as long as the air intake system of the engine includes a gas passageway leading towards a combustion chamber.

FIG. 5 illustrates, by way of example, the typical configuration of an air intake system for an internal combustion engine (not shown) of the type that employs a carburettor 12. The air intake system typically includes a gas passageway in the form of an air entry chamber 14 commonly referred to as a "throat" or "air-horn" leading into the carburettor 12. The passageway delimiting wall takes the form of upwardly protruding chamber wall 16.

Figure 1:
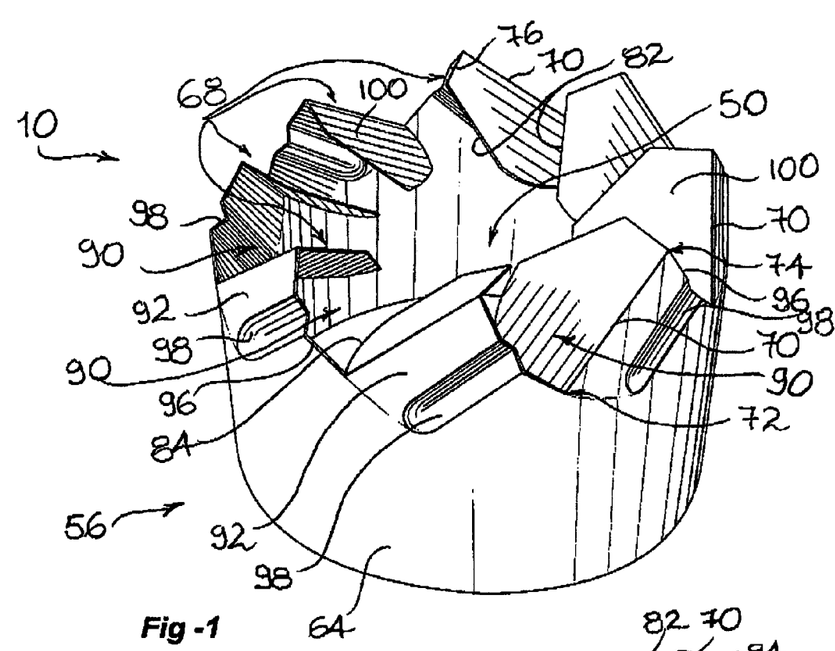
FIG. 1, in a top perspective view, illustrates a flow guiding structure in accordance with an embodiment of the present invention.

With the air intake system illustrated in FIG. 1, the chamber wall 16 has a substantially circular configuration. However, the chamber wall may take other configurations such as that of rectangles, squares, semi-circles, ovals or the like as is well known in the art.

An air cleaner housing 18 is typically mounted to the carburettor 12. The air cleaner housing 18 includes a housing base wall 20, a housing peripheral wall 22 extending from the housing base wall 20 and a removable housing lid 24 mountable over the housing peripheral wall 22. A wing nut screw 26 typically releasably secures the housing lid 24 to the remainder of the air cleaner housing via a threaded stem (not shown) located adjacent the top of the carburettor 12.

An air inlet duct 30 typically extends radially from the housing peripheral wall 22 in fluid communication with the interior of the air cleaning housing 18. As indicated by arrows 32, the duct 30 facilitates and guides radial intake of air into the air cleaner housing 18.

An annular air filter 34 is mounted between the upper surface of the housing base wall 20 and the inner surface of the housing lid 24. The annular air filter 34 defines a filter top surface 36, an opposed filter bottom surface 38, an outer circumferential air inlet surface 40 and an inner circumferential air outlet surface 42.

The guiding structure 10 is configured and sized so as to be mountable between the air outlet surface 42 of the air filter 34 and the delimiting wall 16 of the air entry chamber 14. Typically, the structure 10 is configured and sized so as to fit around the outside of the delimiting wall 16 of the air entry chamber 14 in a substantially fit or snug fashion.

Hence, in situations wherein the delimiting wall 16 has a substantially circular shape, the structure 10 accordingly has a substantially similar circular shape and, when the delimiting wall 16 has other shapes, the structure 10 typically has a corresponding shape. Also, the height of the structure 10 is typically sized so as to snugly fit within the air cleaner housing 18 when the lid 24 is secured to the remainder of the housing 18. Typically, the height of the structure 10 is substantially similar to the height of the air filter 34. It should, however, be understood that the device 10 could have other configurations and be otherwise sized without departing from the scope of the present invention.

FIG. 7, illustrates a portion of an air intake system for a fuel injected internal combustion engine 44 (only a portion of which is shown) comprising a throttle body 46. The air intake system illustrated in FIG. 7, typically includes an air filter unit 48 (only a portion of which is shown). A mass air sensor (not shown) is pneumatically coupled to the air filter unit 48 upstream from the latter. An air inlet hose 52 is pneumatically coupled between the mass air sensor and the throttle body 46. Clamps 54 are typically used to secure the components in position relative to one another.

The guiding structure 10 is typically mounted in the air inlet hose 52 substantially adjacent the throttle body 46. Alternatively, one or more guiding structures 10 may be housed within the air inlet hose 52. The air inlet hose 52 is hence adapted to act as the gas passageway into which the predetermined flow pattern will be induced by guiding structure 10. The peripheral wall 56 of the air inlet hose 52 is hence adapted to act as the passageway delimiting wall for the configuration shown in FIG. 7.

As shown in the examples illustrates in FIGS. 5 and 7, the guiding structure 10 is adapted to be positioned respectively either outwardly or inwardly relative to the passageway delimiting wall 16, 56 delimiting the gas passageway 14, 52 into which the guiding structure 10 will induce a predetermined flow pattern. Furthermore, as illustrated in the examples shown in FIGS. 5 and 7, the guiding structure 10 is adapted to be mounted so that the flow of gas will initially impinge thereon either respectively in a radial or an axial direction relative to the latter.

Figure 3:
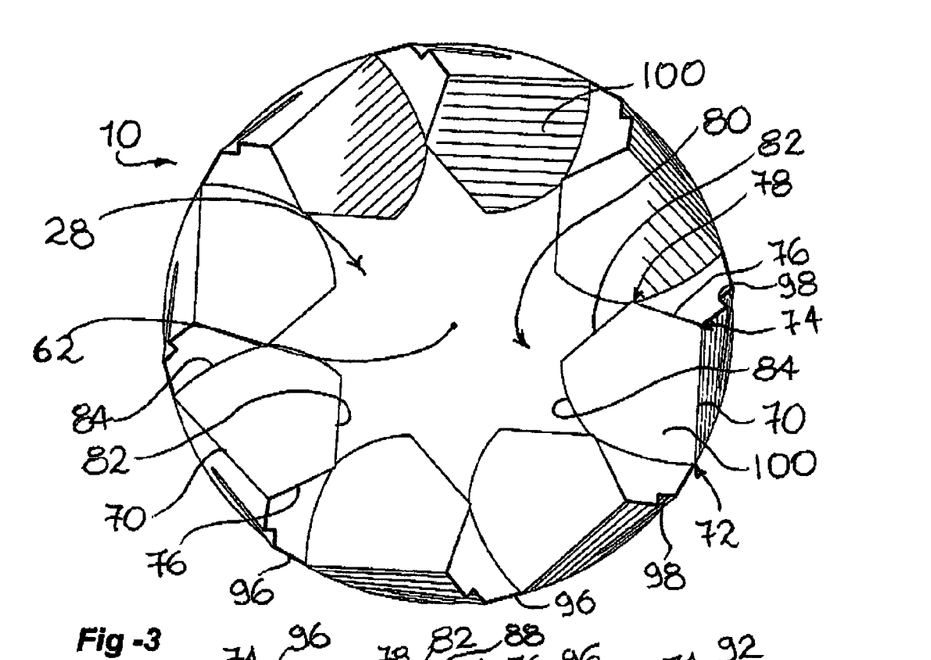
FIG. 3, in a top view, illustrates a flow guiding structure in accordance with an embodiment of the present invention.
Figure 4:
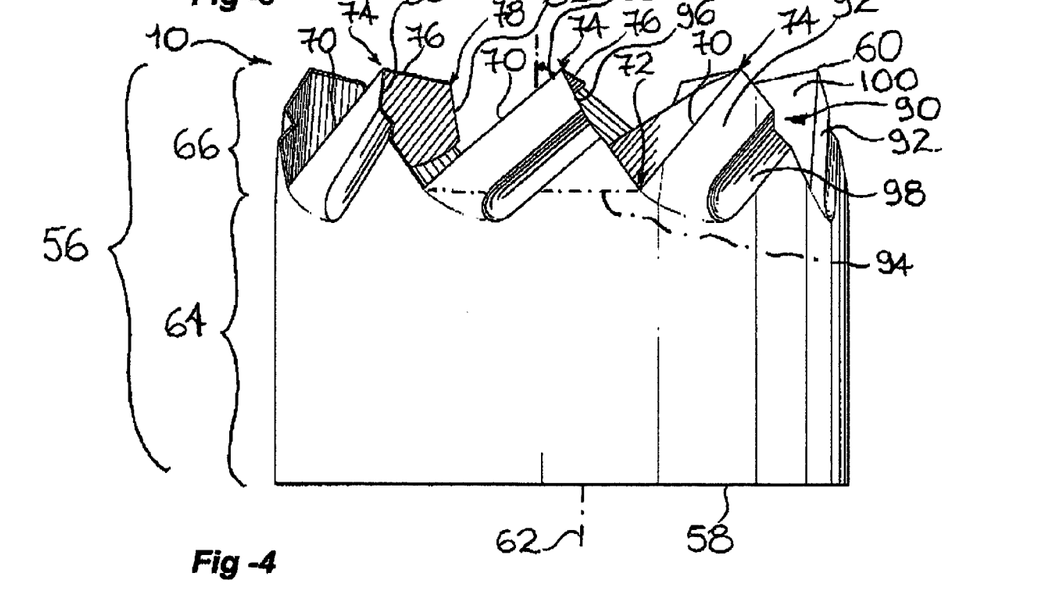
FIG. 4, in an elevational view, illustrates a flow guiding structure in accordance with an embodiment of the present invention.

Regardless of the position of the guiding structure 10 relative to the gas passageway 14, 52, or the impinging flow of gas, the guiding structure 10 typically has substantially the configuration illustrated more specifically in FIGS. 1, 3 and 4. The structure 10 includes a substantially tubular peripheral wall 56 delimiting a structure passageway 50. Typically, structure passageway 50 is generally co-extensive with the cross-sectional area of the gas passageway to which it is mounted.

In the embodiment shown throughout the Figures, the peripheral wall 56 has a substantially circular configuration. However, the configuration of the peripheral wall 56 may vary without departing from the scope of the present invention. Typically, the configuration of the peripheral wall 56 corresponds substantially to that of the passageway delimiting wall at the location where the guiding structure 10 is positioned such as the substantially circular passageway delimiting walls 16, 56 illustrated respectively in FIGS. 5 and 7.

The peripheral wall 56 defines a peripheral wall first edge 58, an opposed peripheral wall second edge 60 and a passage longitudinal axis 62. The peripheral wall 56 has a base section 64 extending from the peripheral wall first edge 58 for allowing the structure 10 to be secured to the gas passageway 14, 52. The peripheral wall 56 also has a guiding section 66 extending substantially from the base section 64 to the peripheral wall second edge 60 for allowing the flow of gas to be guided into the predetermined flow pattern.

The guiding structure 10 also includes a plurality of guiding vanes 68. Typically, the guiding structure 10 includes approximately five guiding vanes 68 although the guiding structure 10 could include any suitable number of guiding vanes without departing from the scope of the present invention.

Each guiding vane 68 extends substantially radially inward from the guiding section 66 about a corresponding vane first edge 70. Each of the vane first edges 70 extends from a first edge proximal end 72 located substantially adjacent the base section 64 to a first edge distal end 74 located substantially adjacent the peripheral wall second edge 60.

At least one and preferably all of the guiding vanes 68 include a vane second edge 76 extending in a second edge geometrical plane substantially perpendicular to the structure longitudinal axis 62 from the first edge distal end 74 to a second edge distal end 78.

At least one guiding vane 68 and preferably all guiding vanes 68 also include a vane third edge 80 extending from the second edge distal end 78 to the first edge proximal end 72. Typically, the vane third edge 80 has a substantially convex configuration. Typically, the vane third edge 80 includes a substantially rectilinear third edge first segment 82 extending from the second edge distal end 78. Typically, the third edge first segment 82 extends at an angle relative to the vane second edge 76 generally radially inwardly and away from the second edge geometrical plane.

Typically, the vane third edge 80 also includes a substantially arcuate third edge second segment 84 extending from the third edge first segment 82 to the first edge proximal end 72. Typically, although by no means exclusively, the third edge second segment 84 has substantially the configuration of an arc segment of a circle, an ellipse or the like. The vane first, second and third edges 70, 76 and 80 together delimit a guiding surface 100 for guiding the flow of gas contacting the latter.

Typically, although by no means exclusively, the length of the vane second edge 76 is approximately between ¼ and ¾ that of the vane first edge 70. Typically, although by no means exclusively, the length of the vane second edge 76 is approximately ⅓ that of the vane first edge 70. Typically, although by no means exclusively, the third edge first segment 82 and the vane second edge 76 form a first segment-to-second edge angle 86 therebetween, the first segment-to-second edge angle 86 being typically obtuse.

Typically, although by no means exclusively, the first segment-to-second edge angle 86 has a value of approximately 135 degrees. Typically, although by no means exclusively, the length of the third edge first segment 82 is approximately 2.5 times that of the vane second edge 76.

As illustrated more specifically in FIG. 4, each of the guiding vanes 68 is oriented in a vane plane extending radially inward, slanted at a vane-to-axis angle 88 relative to the structure longitudinal axis 62. Typically, although by no means exclusively, the vane-to-axis angle 88 is selected from a range of between 25 degrees and 75 degrees. Preferably, the vane-to-axis angle 88 has a value of approximately 45 degrees.

Figure 2:
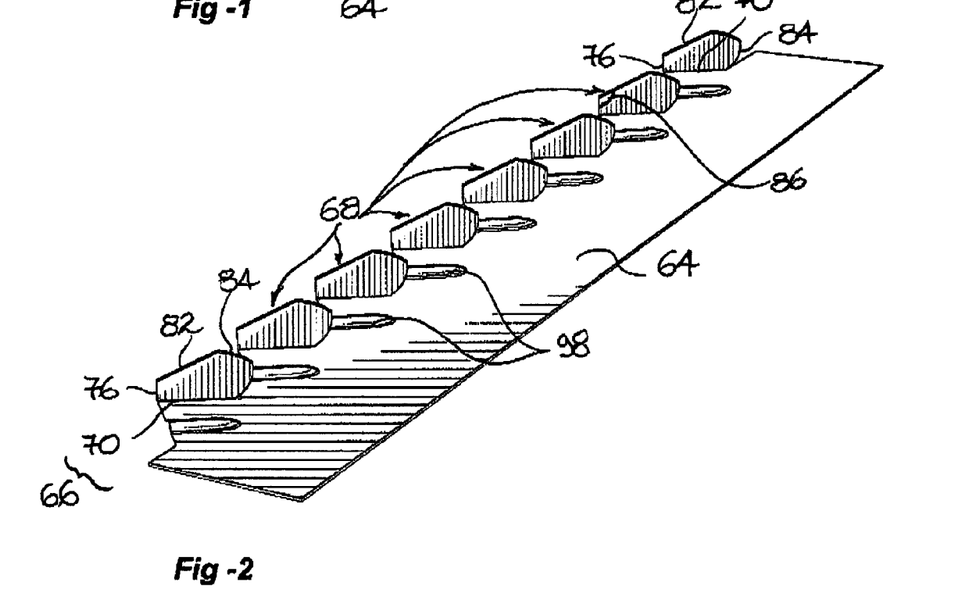
FIG. 2, in a perspective view, illustrates a flow guiding structure in accordance with an embodiment of the present invention with its peripheral wall base section in a flattened configuration.

As illustrated more specifically in FIG. 2, the guiding vanes 68 typically extend generally perpendicularly or normal to the inner surface of the guiding section 66. It should, however, be understood that the guiding vanes 68 can extend with other angular relationships relative to the inner surface of the guiding section 66 without departing from the scope of the present invention.

Typically, the guiding vanes 68 are positioned circumferentially and are symmetrically disposed relative to each other. Alternatively, the guiding vanes 68 could be in a non-symmetrical relationship relative to each other without departing from the scope of the present invention. Also, typically, the configuration, size and angular positioning of the guiding vanes 68 is typically identical for each guiding vane 68. However, such characteristics of the guiding vane 68 could be different for each guiding vane 68 or for individual guiding vanes 68 without departing from the scope of the present invention.

As illustrated more specifically in FIG. 3, the guiding vanes 68 preferably extend only partway towards the centre of the structure passageway 50 so as to leave a central channel 28 clear of any guiding vanes 68.

In the embodiment illustrated throughout the Figures, the guiding section 66 includes a plurality of radial apertures 90 formed therein. Each of the radial apertures 90 is in fluid communication with a corresponding guiding vane 68 for allowing radially flowing gas to penetrate through the radial apertures 90 into the structure passage 58 and to be guided by the guiding vanes 68 into the predetermined flow pattern.

Typically, the radial apertures 90 are formed by substantially V-shaped notches extending substantially from the peripheral wall second edge 60 to the base section 64. Accordingly, the guiding section 66 includes substantially triangular guiding section segments 92 separated from each other by the substantially V-shaped notches forming the radial apertures 90. Each of the substantially triangular guiding section segments 92 includes a virtual segment base 94 and an opposed segment apex located respectively substantially adjacent the interface between the base and guiding sections 66, 64 and the peripheral wall second edge 60.

The vane first edge 70 typically extends from the segment apex to the segment base 94. A segment auxiliary edge 96 also extends from the segment apex to the segment base 94 in a substantially diverging relationship relative to the vane first edge 70. In the embodiment illustrated throughout the Figures, the segment auxiliary edge 96 has a substantially arcuate configuration. It should, however, be understood that the segment auxiliary edge 96 could have a rectilinear configuration or other configurations without departing from the scope of the present invention.

At least one and preferably all of the guiding section segments 92 are provided with a guiding fold or bent 98 formed therein. The guiding bents 98 are configured, sized and positioned so as to act as an auxiliary guide for guiding the flow of gas into the predetermined flow pattern. The guiding bents 98 are also preferably configured, sized and positioned so as to improve the structural characteristics of the guiding structure 10 and, more specifically, to structurally reinforce the guiding section 66.

The guiding folds or bents 98 typically extend inwardly into the structure passage 58. Typically, the guiding bents 98 extend in a direction substantially parallel to the vane first edge 76. Typically, the guiding bents 98 extend from a position substantially midway along the segment auxiliary edge 96 to a position substantially midway along the segment base 94. It should be understood that although the guiding bent is shown as having a substantially V-shaped cross-sectional configuration, the guiding bent 98 could have other configurations without departing from the scope of the present invention.

In use, in the implementation depicted in FIG. 5, the intake air flows through the duct 30 as illustrated by arrows 32. The air then penetrates into the outer circumferential air inlet surface 40 of the air filter 34, is filtered by the latter and exits at the inner circumferential air outlet surface 42. The air then impinges upon the vane first edges 70 of the vanes 68 and passes over the guiding surfaces 100 of the vanes 68 into the structure passageway 50 where it is guided in a swirling configuration prior to penetrating into the gas passageway 14 of the carburettor 12.

The orientation of the vane second edges 76 in a geometrical plane substantially perpendicular to the structure longitudinal axis 62 increases the dimension of the effective guiding surfaces 100 of the guiding vanes 68. Furthermore, the configuration of the vane third edge 80 also provides additional surface area while retaining adequate structural stability of the guiding section 66.

In the implementation depicted in FIG. 7, the intake air passes through and is filtered by the air filter unit 48. The intake air then passes through the mass air sensor which measures the quantity of air flow prior to passing through the air inlet hose 52. While passing through the air inlet hose or gas passageway 52, the air impinges upon the vane second edges 76 and the third edge first segments 82 of the guiding vanes 68. The guiding vanes 68 manipulate or guide the air flow into a generally vortex configuration. The intake air then enters the throttle body 46 where fuel is added prior to induction into the combustion chamber or cylinder of the engine 44.

Preferably, the guiding vanes 68 are configured, sized and positioned so as to guide the flow of gas into a substantially clockwise swirling flow pattern. Preferably, the clockwise swirling flow pattern is also directed substantially radially outward towards the peripheral wall 56.

The guiding structure 10 may be manufactured out of any suitable material such as a suitable polymeric resin or metallic material. In one embodiment of the invention, the guiding structure 10 is manufactured out of stainless steel.

Typically, the guiding structure 10 is made out of a unitary integral piece of material. When a metallic material is used, the guiding structure 10 may be manufactured using the following steps: punching or die-cutting the vane third edge 80 in a planar sheet of metal; cutting the metal sheet at the peripheral wall first and second edges 58, 60 to form strips of the desired height dimension; bending the guiding vanes 68 into position at the desired angle about the vane first edges 70; cutting the strips into the desired length or number of guiding vanes 68; roll-pressing the flat strips into the desired configuration which, for example, may be the general circular configuration illustrated throughout the Figures.

Alternatively, the guiding structure 10 may be formed integrally with the gas passageway through a suitable manufacturing process such as injection moulding or the like. In such an embodiment, the guiding vanes 68 may extend directly from the passageway delimiting wall without the need for a tubular peripheral wall.

The embodiments of the invention, in which an exclusive property or privilege is claimed, are defined as follows:

1. A flow guiding structure for guiding into a predetermined flow pattern a flow of gas flowing into a gas passageway leading towards a combustion chamber of an internal combustion engine, said gas passageway including a passageway delimiting wall and defining a passageway axis, said structure comprising:

a substantially tubular peripheral wall delimiting a structure passage, said peripheral wall defining a peripheral wall first edge, an opposed peripheral wall second edge and a passage longitudinal axis; said peripheral wall having a base section extending from said peripheral wall first edge for allowing said structure to be secured to said gas passageway; said peripheral wall also having a guiding section extending substantially from said base section to said peripheral wall second edge for allowing said flow of gas to be guided into said predetermined flow pattern;

a plurality of guiding vanes, each extending substantially radially inward from said guiding section about a corresponding vane first edge; each of said vane first edges extending from a first edge proximal end located substantially adjacent said base section to a first edge distal end located substantially adjacent said peripheral wall second edge;

at least one of said guiding vanes including a vane second edge extending in a second edge geometrical plane substantially perpendicular to said structure longitudinal axis from said first edge distal end to a second edge distal end;

said at least one of said guiding vanes also including a vane third edge extending from said second edge distal end to said first edge proximal end.

2. A structure as recited in claim 1, wherein the length of said vane second edge is approximately between ¼ and ¾ that of said vane first edge.

3. A structure as recited in claim 1, wherein the length of said vane second edge is approximately ⅓ that of said vane first edge.

4. A structure as recited in claim 1, wherein said vane third edge has a substantially convex configuration.

5. A structure as recited in claim 4, wherein said vane third edge includes a substantially rectilinear third edge first segment extending from said second edge distal end.

6. A structure as recited in claim 5, wherein said third edge first segment extends at an angle relative to said vane second edge generally radially inward and away from said second edge geometrical plane.

7. A structure as recited in claim 6, wherein said third edge first segment and said vane second edge form a first segment-to-second edge angle therebetween, said first segment-to-second edge angle being obtuse.

8. A structure as recited in claim 7, wherein said first segment-to-second edge angle has a value of approximately 135 degrees.

9. A structure as recited in claim 5, wherein the length of said third edge first segment is approximately 2.5 times that of said vane second edge.

10. A structure as recited in claim 5, wherein said vane third edge also includes a substantially arcuate third edge second segment extending from said third edge first segment to said first edge proximal end.

11. A structure as recited in claim 1, wherein each of said vanes is oriented in a vane plane extending radially inward, slanted at a vane-to-axis angle relative to said structure longitudinal axis, said vane-to-axis angle being selected from a range of between 25 and 75 degrees.

12. A structure as recited in claim 1, wherein said guiding section is also provided with an auxiliary guiding means for further guiding said flow of gas into said predetermined flow pattern, said auxiliary guiding means also acting as a reinforcement means for structurally reinforcing said structure.

13. A structure as recited in claim 1, wherein said guiding section includes at least one guiding bent formed therein.

14. A structure as recited in claim 13, wherein said at least one guiding bent extends along a bent line substantially parallel to a corresponding vane first edge.

15. A structure as recited in claim 1, wherein said guiding section includes a plurality of radial apertures formed therein, each of said radial apertures being in fluid communication with a corresponding guiding vane for allowing radially flowing gas to penetrate through said radial apertures into said structure passage and to be guided by said guiding vane into said predetermined flow pattern.

16. A structure as recited in claim 15, wherein said radial apertures are formed by substantially V-shaped notches extending substantially from said peripheral wall second edge to said base section; wherein said guiding section includes substantially triangular guiding section segments separated from each other by said substantially V-shaped notches; each of said substantially triangular guiding section segments including a segment base and a substantially opposed segment apex located respectively substantially adjacent the interface between said base and guiding sections and said peripheral wall second edge; said vane first edge extending from said segment apex to said segment base; each of said substantially triangular guiding section segment also including a segment auxiliary edge also extending from said segment apex to said segment base in a substantially divergent relationship relative to said vane first edge; at least one of said guiding section segments being provided with a guiding bents formed therein, said at least one guiding bent being configured, sized and positioned so as to act as an auxiliary guide for guiding said flow of gas into said predetermined flow pattern.

17. A structure as recited in claim 16, wherein said at least one guiding bent extends substantially inwardly into said structure passage, said at least one guiding bent extending in a direction substantially parallel to said vane first edge from a position substantially midway along said segment auxiliary edge to a position substantially midway along said segment base.

18. A flow guiding structure for guiding into a predetermined flow pattern a flow of gas flowing into a gas passageway leading towards a combustion chamber of an internal combustion engine, said gas passageway including a passageway delimiting wall and defining a passageway axis, said structure comprising:

a plurality of guiding vanes, each extending substantially radially inward from said guiding section about a corresponding vane first edge; each of said vane first edges extending from a first edge proximal end located substantially adjacent said base section to a first edge distal end located substantially adjacent said peripheral wall second edge;

each of said guiding vanes including a vane second edge extending in a second edge geometrical plane substantially perpendicular to said structure longitudinal axis from said first edge distal end to a second edge distal end;

each of said guiding vanes also including a vane third edge extending from said second edge distal end to said first edge proximal end.

19. A flow guiding structure for guiding into a predetermined flow pattern a flow of gas flowing into a gas passageway leading towards a combustion chamber of an internal combustion engine, said gas passageway including a passageway delimiting wall and defining a passageway axis, said structure comprising:

a substantially tubular peripheral wall delimiting a structure passage, said peripheral wall defining a peripheral wall first edge, an opposed peripheral wall second edge and a passage longitudinal axis; said peripheral wall having a base section extending from said peripheral wall first edge for allowing said structure to be secured to said gas passageway; said peripheral wall also having a guiding section extending substantially from said base section to said peripheral wall second edge for allowing said flow of gas to be guided into said predetermined flow pattern;

a plurality of guiding vanes, each extending radially inward from said guiding section, said guiding vanes being configured, sized and positioned so as to guide said flow of gas into said predetermined flow pattern;

said guiding section being provided with at least one guiding bent formed therein and extending substantially inward into said structure passage, said at least one guiding bent being configured, positioned and sized so as to act as an auxiliary guide and cooperate with said guiding vanes for guiding said flow of gas into said predetermined flow pattern.

20. A structure as recited in claim 19, wherein said at least one guiding bent is configured, positioned and sized so as to bias said flow of gas substantially radially outward towards said peripheral wall.

21. A flow guiding structure for guiding into a predetermined flow pattern a flow of gas flowing into a gas passageway leading towards a combustion chamber of an internal combustion engine, said gas passageway including a passageway delimiting wall and defining a passageway axis, said structure comprising:

a substantially tubular peripheral wall delimiting a structure passage, said peripheral wall defining a peripheral wall first edge, an opposed peripheral wall second edge and a passage longitudinal axis; said peripheral wall having a base section extending from said peripheral wall first edge for allowing said structure to be secured to said gas passageway; said peripheral wall also having a guiding section extending substantially from said base section to said peripheral wall second edge for allowing said flow of gas to be guided into said predetermined flow pattern;

a plurality of guiding vanes, each extending substantially radially inward from said guiding section, said guiding vane being configured, sized and positioned so as to guide said flow of gas into a substantially clockwise swirling flow pattern.

22. A structure as recited in claim 21, wherein said flow structure guides said flow of gas into a substantially radially outwardly directed clockwise swirling flow pattern.

* * * * *